US012700942B1

(12) United States Patent     (10) Patent No.: US 12,700,942 B1

Campos et al.     (45) Date of Patent: Aug. 4, 2026

(54) SYSTEMS AND METHODS FOR EDGE WAVELENGTH SELECTIVE SWITCHING

(71) Applicant: CABLE TELEVISION LABORATORIES, INC., Louisville, CO (US)

(72) Inventors: Luis Alberto Campos, Superior, CO (US); Zhensheng Jia, Superior, CO (US); Haipeng Zhang, Broomfield, CO (US); Jing Wang, Broomfield, CO (US); Junwen Zhang, Broomfield, CO (US); Mu Xu, Shoreline, WA (US)

(73) Assignee: Cable Television Laboratories, Inc., Louisville, CO (US)

( * ) Notice: Subject to any disclaimer, the term of this patent is extended or adjusted under 35 U.S.C. 154(b) by 347 days.

(21) Appl. No.: 18/241,721

(22) Filed: Sep. 1, 2023

Related U.S. Application Data

(60) Provisional application No. 63/357,765, filed on Jul. 1, 2022.

(51) Int. Cl.
*H04J 14/02* (2006.01)

(52) U.S. Cl.
CPC .............................. *H04J 14/0212* (2013.01)

(58) Field of Classification Search
CPC .................................................. H04J 14/0212
See application file for complete search history.

(56) References Cited

U.S. PATENT DOCUMENTS

| | | | | |
|---|---|---|---|---|
| 6,362,708 B1 * | 3/2002 | Woods | .................. | H03F 3/601 |
| | | | | 333/219.1 |
| 7,773,642 B2 * | 8/2010 | Yamazaki | ............. | G02F 1/0147 |
| | | | | 372/99 |
| 9,432,113 B2 * | 8/2016 | Oi | ........................ | H04B 10/564 |
| 9,706,273 B2 * | 7/2017 | Haslam | ............... | H04J 14/0201 |
| 9,831,978 B1 * | 11/2017 | Mehrvar | ............. | H04J 14/0241 |
| 10,277,352 B2 * | 4/2019 | Chedore | ............ | H04Q 11/0005 |
| 11,063,683 B1 * | 7/2021 | Jones | .................. | H04J 14/0219 |
| 11,079,551 B2 * | 8/2021 | Roorda | ............. | G02B 26/0833 |
| 11,496,213 B2 * | 11/2022 | Kilper | ................ | H04B 10/0775 |
| 2001/0024542 A1 * | 9/2001 | Aina | .................... | H04J 14/0213 |
| | | | | 385/24 |
| 2002/0039470 A1 * | 4/2002 | Braun | .................. | G02B 6/3536 |
| | | | | 385/27 |
| 2004/0114926 A1 * | 6/2004 | Kim | .................... | H04J 14/0208 |
| | | | | 398/59 |

(Continued)

*Primary Examiner* — Tanya T Motsinger

(74) *Attorney, Agent, or Firm* — Cozen O'Connor

(57) ABSTRACT

A wavelength selective switch includes a first optical pathway for carrying first and second wavelengths to and from a first direction, a second optical pathway for carrying at least one wavelength to and from a second direction, a first add/drop port in communication with at least one of the first and second optical pathways over a third optical pathway, a first tunable wavelength topology coupled with the third optical pathway and one of the first and second optical pathways for optical transport of the first wavelength from the first direction to the first add/drop port, a second tunable wavelength topology coupled with the third optical pathway and one of the first and second optical pathways for optical transport of the second wavelength from the first add/drop port to the first direction. The first and second tunable wavelength topologies are configured to dynamically re-tune to a third wavelength.

20 Claims, 17 Drawing Sheets

(56) References Cited

U.S. PATENT DOCUMENTS

| | | | | |
|---|---|---|---|---|
| 2004/0258360 A1* | 12/2004 | Lim | H01S 5/141 | 385/28 |
| 2007/0009204 A1* | 1/2007 | Ducellier | H04Q 11/0005 | 385/24 |
| 2008/0193133 A1* | 8/2008 | Krug | H04J 14/0219 | 398/83 |
| 2009/0067773 A1* | 3/2009 | Krug | G02F 1/065 | 385/9 |
| 2009/0232497 A1* | 9/2009 | Archambault | H04J 14/0297 | 398/50 |
| 2014/0056584 A1* | 2/2014 | Testa | H04J 14/02122 | 398/49 |
| 2014/0147121 A1* | 5/2014 | Matsukawa | H04J 14/0217 | 398/83 |
| 2014/0255026 A1* | 9/2014 | Roorda | H04Q 11/0005 | 398/83 |
| 2015/0098696 A1* | 4/2015 | Oi | H04Q 11/0003 | 398/38 |
| 2015/0215066 A1* | 7/2015 | Testa | H04Q 11/0005 | 398/48 |
| 2015/0358109 A1* | 12/2015 | D'Errico | H04J 14/02216 | 398/19 |
| 2016/0204892 A1* | 7/2016 | Testa | H04J 14/0219 | 398/48 |
| 2017/0261692 A1* | 9/2017 | Knights | G02B 6/12007 | |
| 2018/0062782 A1* | 3/2018 | Mehrvar | H04B 10/25891 | |
| 2018/0074263 A1* | 3/2018 | Hickey | G02F 1/011 | |
| 2018/0091233 A1* | 3/2018 | Hickey | H04B 10/70 | |
| 2019/0020438 A1* | 1/2019 | Kang | H04B 10/0779 | |
| 2019/0081723 A1* | 3/2019 | Boduch | H04B 10/07957 | |
| 2019/0215089 A1* | 7/2019 | Huang | H04J 14/0283 | |
| 2019/0379479 A1* | 12/2019 | Boduch | H04J 14/0215 | |
| 2021/0175972 A1* | 6/2021 | Cavaliere | H04B 10/2971 | |
| 2021/0250116 A1* | 8/2021 | Oldenbeuving | H04J 14/0212 | |
| 2021/0255393 A1* | 8/2021 | Mansouri Rad | H04B 10/5059 | |
| 2022/0140564 A1* | 5/2022 | Song | H01S 3/06704 | 372/18 |
| 2024/0201336 A1* | 6/2024 | Lee | H01S 5/142 | |
| 2024/0201387 A1* | 6/2024 | Kim | H01S 5/1071 | |
| 2025/0291117 A1* | 9/2025 | Vaithianathan | G02B 6/12007 | |
| 2025/0343618 A1* | 11/2025 | Buchbinder | H04J 14/06 | |

* cited by examiner

SYSTEMS AND METHODS FOR EDGE WAVELENGTH SELECTIVE SWITCHING

CROSS REFERENCE TO RELATED APPLICATIONS

This application claims the benefit of and priority to U.S. Provisional Patent Application Ser. No. 63/357,765, filed Jul. 1, 2022, which is incorporated herein by reference in its entirety.

BACKGROUND

The field of the disclosure relates generally to communication networks, and more particularly, to communication networks implementing wavelength selective switches.

Conventional communication systems include wired networks (e.g., cable, fiber optic, hybrid fiber coaxial (HFC), etc.) and wireless technologies (e.g., Wi-Fi, Bluetooth, Zigbee, Long Term Evolution (LTE), etc.). Some HFC networks include Wi-Fi and/or small cell LTE base stations within the communication system of the network. Demand for greater wireless data traffic from cell installations has been increasing at an explosive rate. Accordingly, global mobile data traffic is planned to rapidly scale up in the near future, in response to the recent and ongoing deployment of 5G wireless technology, virtual-reality/augmented-reality enhanced entertainment, and self-driving automobiles. Edge Wavelength Switching Systems Conventional optical networks have recently begun to utilize coherent optical technologies to leverage wavelengths to increase the efficiency of fiber resources in optical networks. One such approach is described in greater detail in U.S. Pat. No. 11,271,669, issued Mar. 8, 2022 to the present inventors. The subject matter of this patent is incorporated by reference herein in its entirety. In this patent, the present inventors demonstrated innovative techniques and architectures for replacing complex reconfigurable optical add drop multiplexers (ROADMs), used for directing and switching the optical wavelengths, with a superior wavelength switching system having a significantly simplified architecture with respect to a ROADM. An example of this recent and improved system is described further below with respect to FIG. 1.

FIG. 1 is a schematic illustration of an edge wavelength switching network 100 utilizing an edge wavelength selective switch (EWSS) 102 for an optical access fiber ring 104. System 100 depicts an EWSS cable fiber distribution topology, and includes a hub transceiver 106 and a plurality of nodes or optical distribution centers (ODCs) 108 connected directly or indirectly to hub transceiver 106 over fiber ring 104, and at least one ODC 108' includes EWSS 102. EWSS 102 includes a wavelength selective switch (WSS) 110 having a plurality of output tributaries 112 (e.g., add/drop ports) to local endpoints 114 (e.g., customer premises equipment (CPE) transceivers, such as macro cells, small cells, business users, residential users, fiber nodes, deeper ODCs, etc.), a switch 116, and both a primary fiber port 118 and a secondary fiber port 120 for communication with ring 104. EWSS 102 thus assumed a complexity no higher than a degree 2 ROADM, while also enabling full duplex (FDX) optical transmission, that is, simultaneous bidirectional communication of the same optical wavelength over the same fiber strand, and particularly with respect to the coherent optical technology paradigm. Accordingly, because the same wavelength is used in each direction, only a single optical port is needed for each direction of transmission of the EWSS topology.

The present inventors have expanded upon these optical WSS techniques for alternative and/or further improved efficiency of spectral or hardware resources. For example, U.S. Pat. No. 11,146,351, issued Oct. 12, 2021 (also to the present inventors) introduced a liquid crystal on silicon (LCoS)-based WSS for an optical communication network in communication with an antenna array. The subject matter of this patent is also incorporated by reference herein in its entirety. In this patent, the present inventors introduced a concept for including a resonator-based silicon ring in the WSS.

Accordingly, there is a desire in the field to further expand upon these recent WSS techniques to provide additional flexibility and efficiency of resources to optical communication networks.

BRIEF SUMMARY

In an embodiment, a wavelength selective switch (WSS), includes a first optical pathway configured to carry a plurality of optical wavelengths to and from a first direction. The plurality of optical wavelengths include a first optical wavelength and a second optical wavelength. The WSS further includes a second optical pathway configured to carry at least one optical wavelength of the plurality of optical wavelengths to and from a second direction different from the first direction, and a first add/drop port in communication with at least one of the first and second optical pathways over a third optical pathway. The WSS further includes a first tunable wavelength topology (a) coupled with the third optical pathway and at least one of the first and second optical pathways, and (b) configured to optically transport signal energy of the first optical wavelength from the first direction to the first add/drop port. The WSS further includes a second tunable wavelength topology (a) coupled with the third optical pathway and at least one of the first and second optical pathways, and (b) configured to optically transport signal energy of the second optical wavelength from the first add/drop port to the first direction. At least one of the first and second tunable wavelength topologies is configured to dynamically re-tune to a third optical wavelength different from the first and second optical wavelengths.

In an embodiment, a flexible optical wavelength-selective architecture, includes a directional optical pathway connecting a first optical direction to a second optical direction. The directional optical pathway is configured for carrying a plurality of optical wavelengths. The architecture further includes a first add/drop optical pathway connecting to a first add/drop port, a first plurality of ring structures coupling the directional optical pathway with the first add/drop optical pathway, and a second plurality of ring structures coupling the directional optical pathway with the first add/drop optical pathway. The first plurality of ring structures is configured for carrying one or more optical wavelengths of the plurality of optical wavelengths between the first direction and the add/drop port, and the second plurality of ring structures is configured for carrying one or more optical wavelengths of the plurality of optical wavelengths between the second direction and the add/drop port. Each of the first and second plurality of ring structures includes a plurality of ring resonators having a ring diameter capable of absorbing signal energy of at least one optical wavelength of the plurality of optical wavelengths, and a control element configured to affect the ring diameter to enable the respective ring structure to dynamically tune to signal energy of a different wavelength of the plurality optical wavelengths.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
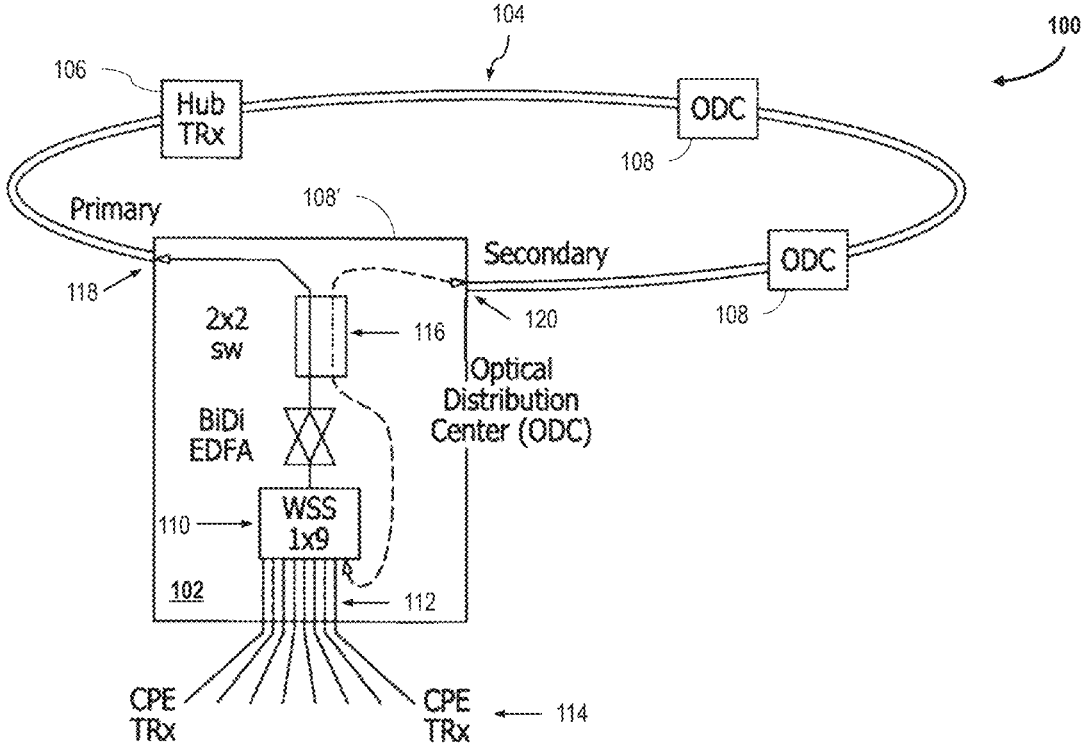
FIG. 1 is a schematic illustration of an edge wavelength switching network utilizing an edge wavelength selective switch for an optical access fiber ring.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

The word "exemplary" is used herein to mean "serving as an example, instance, or illustration." Any embodiment described herein as "exemplary" is not necessarily to be construed as preferred or advantageous over other embodiments.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As described herein, the phrase "user equipment" includes an electronic device or system utilizing an aggressive, non-cooperative technology protocol, such as LTE-U, and may include one or more of a radio terminal, cell phone, a laptop computer, a tablet computer, a wearable device, an Internet of Things (IoT) device, and a wireless equipped motor vehicle. The phrase "Wi-Fi device" includes an electronic device, such as a station or STA, which has the capability to use one of the existing 802.11 protocols. For example, a Wi-Fi device can include, without limitation, one or more of a laptop computer, a desktop personal computer (PC), personal digital assistant (PDA), an AP, and a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

As used herein, the phrase "wireless communication protocol" may refer to one or more cooperative or non-cooperative wireless protocols, including without limitation the 802.11, Wi-Fi, 3G, 4G, 5G, Next Generation (NG), Bluetooth, Zigbee, Long Term Evolution (LTE), and unlicensed LTE (LTE-U) communication protocols.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As used herein, the term "coherent transceiver," unless specified otherwise, refers to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and a "distance" between nodes may be physical or perceptual. A hyperscale datacenter may include several performance optimized datacenters (PODs), and each POD may include multiple racks and hundreds and thousands of compute and/or storage devices."

The systems and methods described herein provide a number of innovative solutions that leverage optical technologies to introduce simplified and flexible topologies and techniques for efficient FDX optical communication in optical networks, including without limitation, fiber ring networks, access networks, HFCs, PONs and coherent PONs (CPONs), backbone networks, regional networks, metro networks, etc. The present embodiments thus realize advantageous maximization of spectral resources for individual optical fiber strands, and without requiring significant reconfiguration of existing fiber connectivity. The present techniques further significantly improve the flexibility of wavelength management and control to achieve superior capabilities for optimization of both existing and future optical networks, while greatly reducing the necessary processing resources therefor.

The present WSS embodiments are particularly useful with respect to conventional optical network topologies where recent WSS improvements have proven advantageous. For example, the recent WSS improvements have enabled a single fiber ring topology to exponentially save, as the number of nodes increase, on the number of fibers required to transmit multiple wavelengths across the network.

The following description features systems, components, and processes for novel EWSS design, for use in both existing and future optical communication networks. For ease of explanation, the following EWSS embodiments are described with respect to fiber ring topology configurations (e.g., system 100, FIG. 1). The person of ordinary skill in the art, however, will understand that such comparative descriptions are for illustration purposes, and are not intended to be limiting. The present EWSS techniques may be implemented in other optical network topologies, and particularly such topological architectures that benefit from the previous WSS innovations from the present inventors, described above. In an exemplary embodiment, an improved EWSS utilizes microring/ring resonator technologies. A conventional ring resonator is described further below with respect to FIGS. 2-3.

Figure 2:
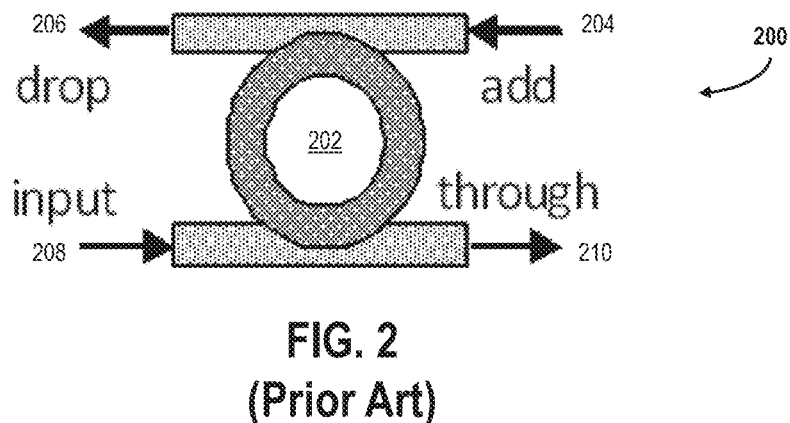
FIG. 2 is a schematic illustration depicting a conventional ring resonator.

FIG. 2 is a schematic illustration depicting a conventional ring resonator 200. Resonator 200 includes at least one microring structure 202 disposed between several optical inputs or outputs, including an add port 204, a drop port 206, an input port 208, and a through port 210. An operating principle of resonator 200 is described further below with respect to FIG. 3.

Figure 3:
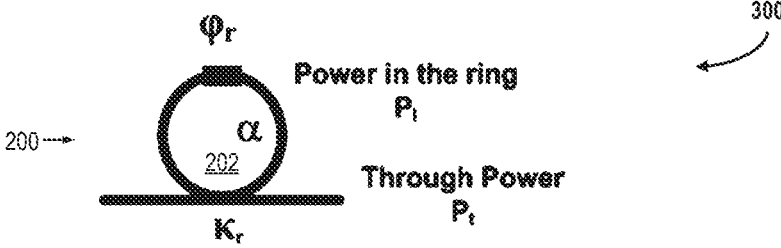
FIG. 3 is a schematic illustration illustrating an operating principle of the conventional ring resonator depicted in FIG. 2.

FIG. 3 is a schematic illustration illustrating an operating principle 300 of conventional ring resonator 200, FIG. 2. That is, in operation, resonator 200 may be described with respect to an amount of power $P_i$ in microring 202, an amount of through power $P_i$ of resonator 200 (e.g., at through port 210), a coupling coefficient K (e.g., at zero coupling to microring 202, K=0), and a loss coefficient $\alpha$ of microring 202 per round trip (e.g., at zero loss, $\alpha$=1). The phase, $\theta_r$, of an optical wavelength, $\lambda$, through resonator 200 is then expressed as:

$$\theta_r = \text{Phase}(\lambda) = 4\pi * n_{\text{eff}} * \frac{r}{\lambda}.$$

In consideration of these conventional ring resonator principles, the following embodiments describe new ring resonator-based architectures and techniques for improved WSS- and EWSS-based systems for optical wavelength communications.

Figure 4A:
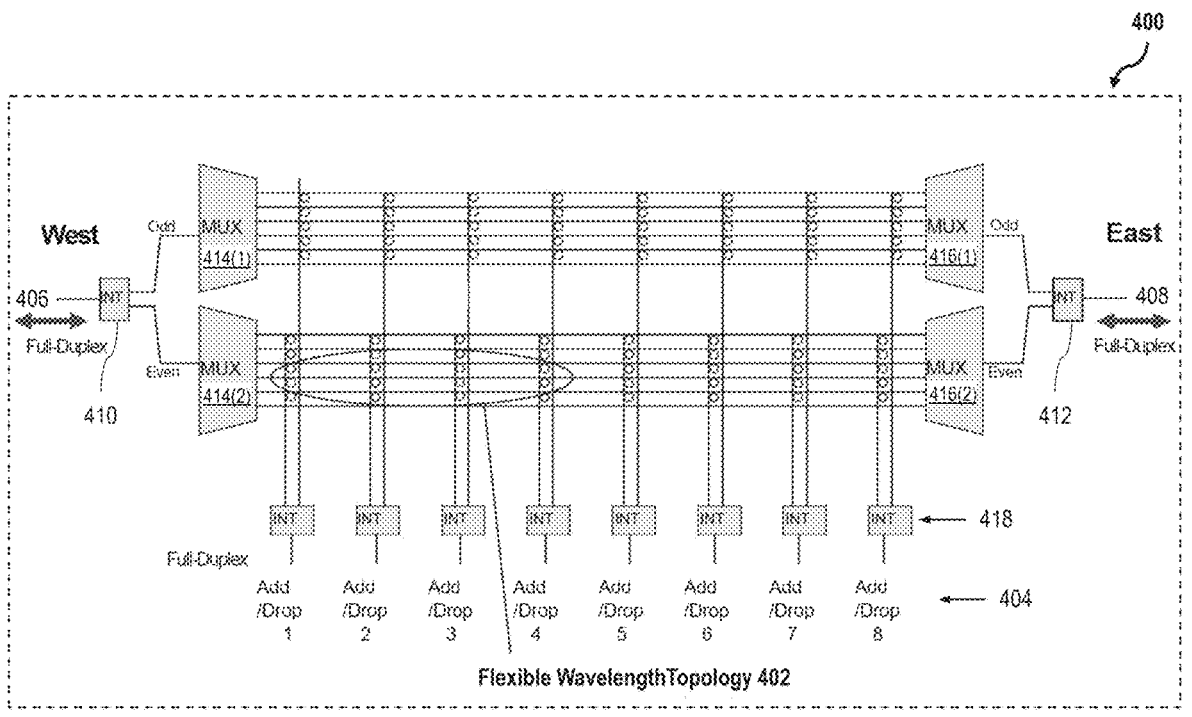
FIG. 4A is a schematic illustration depicting an exemplary flexible edge wavelength selective switch, in accordance with an embodiment.

FIG. 4A is a schematic illustration depicting an exemplary flexible EWSS 400. In the exemplary embodiment depicted in FIG. 4A, flexible EWSS 400 includes an internal flexible wavelength topology 402 that may be advantageously configured for FDX operation. EWSS 400 is similar, in several aspects, to EWSS 102, FIG. 1. For example, EWSS 400 includes a plurality of add/drop ports 404 that are analogous to output tributaries 112, FIG. 1. In this example, eight such add/drop ports 404 are depicted; the person of ordinary skill in the art will understand that this number is provided by way of example, and is not intended to be limiting. EWSS 400 is further similar to EWSS 102 in that EWSS includes a West port 406 and an East port 408, which are analogous to primary fiber port 118 and secondary fiber port 120, respectively, of EWSS 102. Accordingly, at a high level, EWSS 400 may operate as a substitute for EWSS 102.

In an exemplary embodiment, a plurality of wavelengths (e.g., see FIG. 4B, not shown in FIG. 4A) at West port 406 are in communication with a west interleaver 410. In a similar manner, the plurality of wavelengths at East port 408 are in communication with an east interleaver 412. West interleaver 410 may, for example, be in further communication with first and second west multiplexers 414(1) and 414(2) for handling odd and even wavelengths, respectively. In a similar manner, east interleaver 412 may be in further communication with a first east multiplexer 416(1) (e.g., odd wavelengths) and a second east multiplexer 416(2) (e.g., even wavelengths). In the exemplary embodiment, each or add/drop ports 404 may be in communication with a respective add/drop interleaver 418. Optical pathways from add/drop interleavers 418 may then optically connect with respective optical pathways from west and east multiplexers 416, 418 at respective optical crosspoints (not shown in FIG. 4A. see e.g., FIG. 5).

Figure 4B:
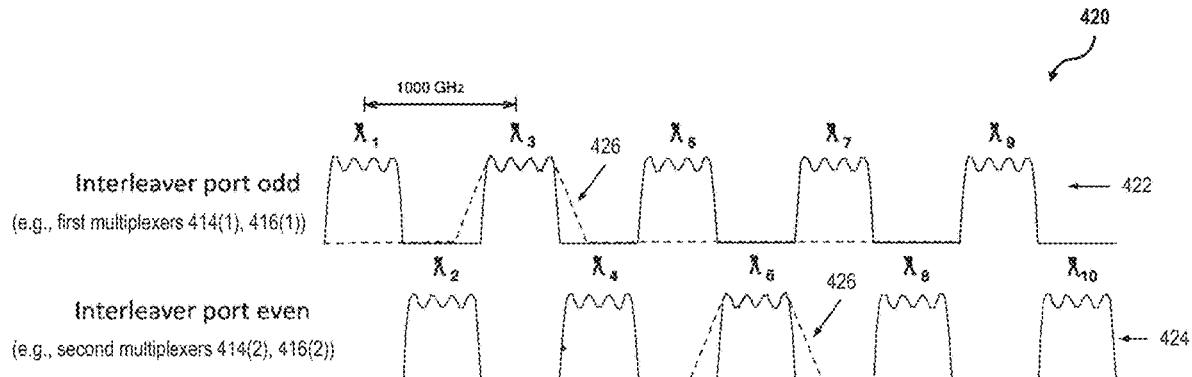
FIG. 4B is a graphical illustration depicting an exemplary interleaving scheme for the wavelength selective switch depicted in FIG. 4A.

FIG. 4B is a graphical illustration depicting an exemplary interleaving scheme 420 for EWSS 400, FIG. 4A. In an exemplary embodiment, west interleaver 410 and east interleaver 412 separate from, or combine into, the plurality of wavelengths (ten separate wavelengths in this example) a series of odd wavelengths 422 (e.g., $\lambda_1$, $\lambda_3$, $\lambda_5$, $\lambda_7$, $\lambda_9$, . . . ) and even wavelengths 424 (e.g., $\lambda^2$, $\lambda_4$, $\lambda_6$, $\lambda_8$, $\lambda_{10}$, . . . ) interspersed, in the frequency domain, between consecutive odd wavelengths 422. Interleaving the respective odd and even wavelengths 422, 424 into separate optical pathways may, for example, serve to mitigate the effect of potential overlap regions 426 (dashed areas) between an immediately adjacent odd/even wavelength pair. In some embodiments, interleaving scheme 420, in cooperation with west and east multiplexers 414, 416, may further serve to improve wavelength tuning capabilities for a variety of scenarios where the temperature conditions of the particular environment may limit the ability to practically tune the wavelengths beyond a certain range. According to interleaving scheme 420, efficient channel isolation may be realized using more inexpensive passive optical components.

Figure 5:
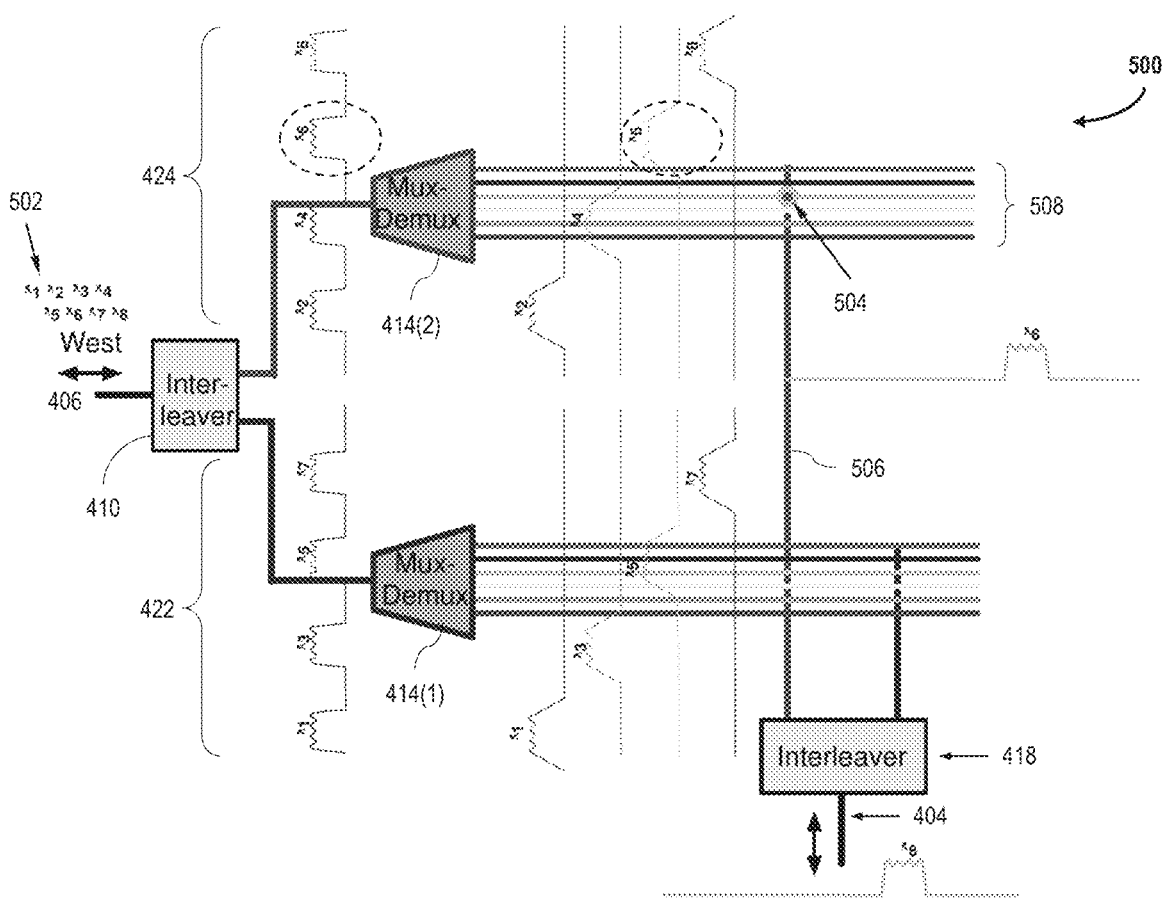
FIG. 5 is a partial schematic illustration depicting an exemplary wavelength selection configuration for the interleaving scheme depicted in FIG. 4B.

FIG. 5 is a partial schematic illustration depicting an exemplary wavelength selection configuration 500 for interleaving scheme 420, FIG. 4B. In an exemplary embodiment, a plurality 502 of wavelengths λ are separated (or combined) at west interleaver 410 into (or from) odd wavelengths 422 at first west multiplexer 414(1) and even wavelengths 424 at second west multiplexer 414(2). Using interleaving scheme 420, a particular add/drop interleaver 418 is enabled to collect (or add) a particular wavelength (16, in this example), from an optical crosspoint 504, connecting an optical pathway 506 from add/drop interleaver 418 to a respective optical pathway 508 from (or to) second west multiplexer 414(2) carrying that desired wavelength. Exemplary topologies (e.g., flexible wavelength topology 402, FIG. 4A) for wavelength selection and tuning are not illustrated in FIG. 5.

Figure 6:
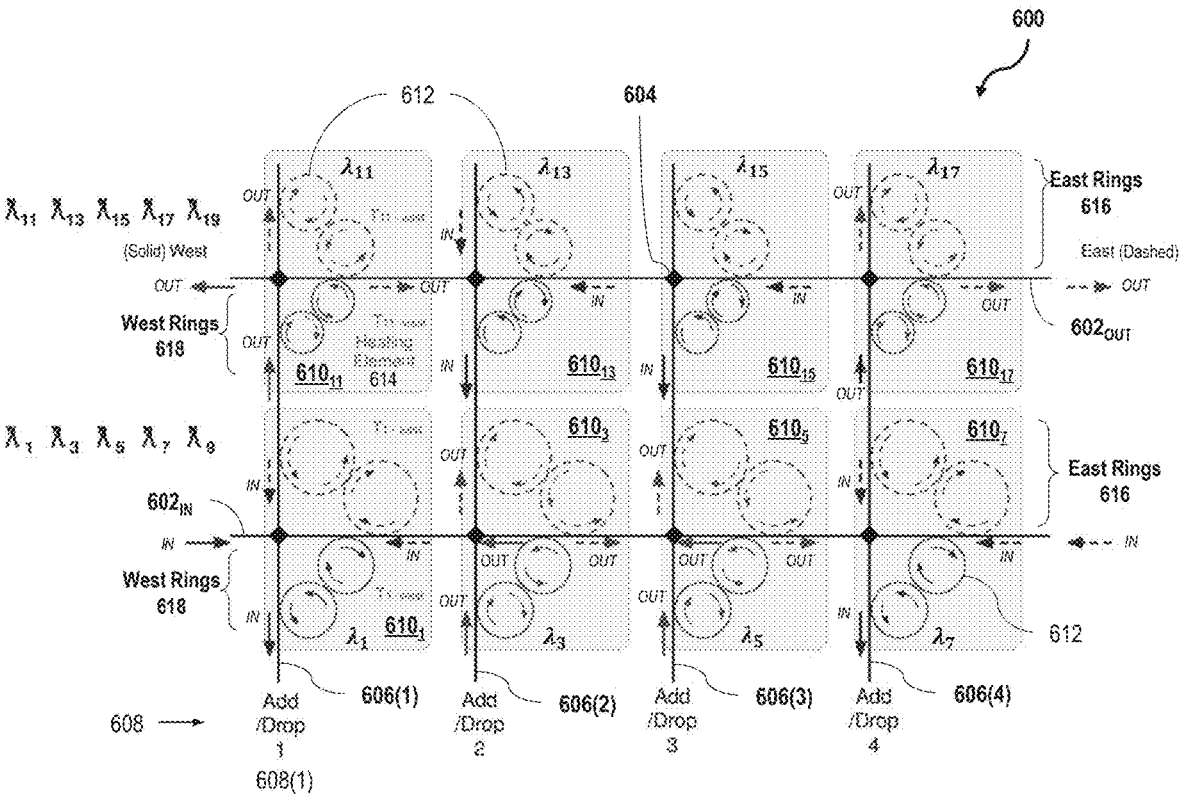
FIG. 6 is a schematic illustration depicting an exemplary architecture for the flexible wavelength topology depicted in FIG. 4A.

FIG. 6 is a schematic illustration depicting an exemplary architecture 600 for flexible wavelength topology 402, FIG. 4A. In the exemplary embodiment depicted in FIG. 6, architecture 600 is illustrated for a second-order ring topology (i.e., two rings per wavelength in each direction) for an FDX EWSS. In this example, for ease of explanation, architecture 600 is further depicted with respect to only odd wavelengths (e.g., according to interleaving scheme 420, FIG. 4B). The person of ordinary skill in the art though, will understand that these depictions are for illustration purposes, and are not intended to be limiting. In an embodiment, architecture 600 may represent flexible wavelength topology 402, FIG. 4A.

In the exemplary embodiment shown, architecture 600 communicates one or more wavelengths (odd wavelengths $\lambda_1, \lambda_3, \lambda_5, \ldots$, in this example) along one or more east/west optical pathways 602. In some embodiments, wavelengths going into architecture 600 may be sent along a separate east/west optical pathway 602 (i.e., east/west optical pathway $602_{IN}$, in this example) from the wavelengths going out from architecture 600 (i.e., along east/west optical pathway $602_{OUT}$). Each east/west optical pathway 602 may then optically connect, at respective optical crosspoints 604 (represented by black diamonds in FIG. 6), with one or more add/drop optical pathways 606 connecting to respective add/drop ports 608.

In the exemplary embodiment, for each communicated wavelength, architecture 600 further includes at least one ring structure 610 proximate each optical crosspoint 604. For ease of explanation, ring structures 610 are illustrated as based on ring resonator technologies for wavelength selectivity and tuning. The person of ordinary skill in the art will understand that this exemplary embodiment is provided for illustration purposes, and is not intended to be limiting. Other optical technologies may be implemented to selectively tune and redirect the signal energy of one or more wavelengths, including without limitation, liquid crystal media or alternative optical pathways utilizing electrolytic and/or nonlinear effects.

In the exemplary embodiment, each ring structure 610 includes a plurality of ring resonators 612 coupled with at least one heating element 614 for controlling the respective ring resonators 612 of the particular ring structure 610. Heating elements 614 may, for example, be in electrical communication with at least one processor (not shown) configured with computer-executable instructions to control a temperature state of individual heating elements 614 to affect the diameter—and thus the frequency tuning—of respective ring resonators 612 coupled thereto. In an exemplary embodiment, each ring structure includes a plurality (e.g., second order or higher) of east rings 616 (solid lines in FIG. 6) for tuning wavelengths from and to the east direction (e.g., East port 408, FIG. 4A), and a similar plurality (e.g., second order or higher) of west rings 618 (dashed lines in FIG. 6) for tuning wavelengths to and from the west direction (e.g., West port 406, FIG. 4A).

In exemplary operation of architecture 600, for a specific ring structure 610, control of the temperature state of heating element 614 enables the processor to change the diameter size(s) of the respective resonator rings 612 coupled thereto, which in turn enables that ring structure 610 to be frequency tuned to a desired wavelength coming in from or out to one of the West or East ports. For example, instead of a conventional switching mechanism (e.g., switch 116, FIG. 1), a particular wavelength may be sent out to the West port by using heating element 614 to tuning the respective west rings 618 of the selected ring structure 610 corresponding to the selected wavelength, while detuning the corresponding east rings 616 of that same ring structure 610 in a similar manner to prevent outward transmission of that same wavelength to the East port.

Accordingly, each ring structure 606 may function to serve as its own WSS for a particular wavelength; an individual ring structure 610 may advantageously send a selected wavelength West by tuning its west rings 618 to the selected frequency, and then by simultaneously detuning its east rings 616 away from that same frequency, and vice versa for the opposite directional case. In this manner, an individual ring structure 610 may advantageously operate as fully-selective wavelength switch using mostly passive components (except for the heating elements, controlled by a system or chip processor. Individual wavelengths can be added or dropped to individual add/drop ports 608 along respective coupling add/drop optical pathways 606, while other wavelengths could be passed through to the West and East ports, or other intervening ring structures 610, along east/west optical pathways 602.

In some embodiments, heating elements 614 may be controlled using as many as five temperature states each individual wavelength within a wavelength group. In other alternative or complementary embodiments, at least two temperature sub-states may be used by a particular ring structure 610 to switch the wavelength direction between the east and west paths. In such cases, the west rings 618 for that ring structure 610 may be sized with different ring diameters R than the east rings 616, but may share a common heating element 614 (e.g., a temperature control pad) for both east and west operation. In an alternative or supplemental embodiment, the respective diameters of ring resonators 612 may expanded or contracted by other techniques, such as an electrolytic effect. In at least one embodiment, the optical path within one or more structures 610 may selected or re-tuned according to techniques that are not necessarily dependent on the physical length of the structure 610 or ring resonators 612 (e.g., by controlling the index of refraction, etc.).

In at least one embodiment, a particular ring structure 610 may be controlled such the same wavelength is sent out to both the West and East ports simultaneously. In such a special use case, both of the particular west rings 618 and east rings 616 of that ring structure 610 would be controlled to tune to the same desired frequency, but then to each send out the common wavelength at respective power levels less than the amount of power expected for one frequency added or dropped to/from a single add/drop port 608. This scenario may be of particular use in the case where two different add/drop ports 608 desire to send or receive the same wavelength. It should further be noted that, due to the flexibility of the topological design of architecture 600, different ring structures 610 may be tuned to a same wavelength to which another ring structure 610 may be tuned/detuned, which may be particularly useful where redundancy is desired.

In one exemplary configuration of architecture 600, ring structures 610 and crosspoints 604 may be arranged in a row-and-column formation, with the "rows" represented by east/west optical pathways 602$_{IN}$, 602$_{OUT}$, and the "columns" represented by add/drop optical pathways 606. For ease of illustration, the following description will be made with respect to the first column from add/drop optical pathway 606(1), including ring structures 610$_1$ and 610$_{11}$.

In exemplary operation, one or more of the plurality of wavelengths enter architecture, from the west direction, along east/west optical pathway 602$_{IN}$ (i.e., the "bottom row" depicted in FIG. 6). In this example, heating element 614$_1$ of ring structure 610$_1$ is configured to tune west rings 618$_1$ to wavelength $\lambda_1$. More particularly, a temperature pad (not separately shown) of heating element 614$_1$ is configured to set a temperature state, $T_{1\text{-}west}$, to tune west rings west rings 618$_1$ to enable an optical path for wavelength $\lambda_1$ to travel from the west direction to add/drop port 608(1) connected to first add/drop optical pathway 606(1). In some embodiments, heating element 614$_1$ may be further configured such that east rings 616$_1$ are de-tuned from wavelength $\lambda_1$, such that further travel of wavelength $\lambda_1$ to the east direction is prevented. As described above though, in at least one embodiment, simultaneous communication of the same wavelength in both the east and west directions may be desirable in some cases.

In further exemplary operation of architecture 600, such as in the case of a fiber ring network, the west path (e.g., a primary communication path) may be broken, compromised, or otherwise interrupted. In such instances, the eastern path may serve as a secondary communication path, and individual wavelengths will then arrive into architecture 600 from the east direction. Accordingly, further to the immediately preceding example, wavelength $\lambda_1$ will arrive at ring structure 610$_1$ from the east direction along east/west optical pathway 602$_{IN}$. In this alternative scenario, heating element 614$_1$ may operate in a similar manner as that described above with respect to wavelengths from the west direction, except that heating element 614$_1$ may instead be configured to set its temperature state to a value $T_{1\text{-}east}$ that will tune east rings 616$_1$ to enable an optical path for wavelength $\lambda_1$ to travel from the east direction to add/drop optical pathway 606(1) and add/drop port 608(1).

In exemplary, one or more of the plurality of wavelengths enter architecture, from the west direction, along i.e., the "bottom row" depicted in FIG. 6). In this example, heating element 614$_1$ of is configured to tune west rings 618$_1$ to wavelength $\lambda1$. More particularly, a temperature pad (not separately shown) of heating element 614$_1$ may be set to a temperature state to control the diameter(s) of west rings 618$_1$ to be able to absorb the signal energy of wavelength $\lambda_1$. In some embodiments, heating element 614$_1$ may be further configured such that east rings 616$_1$ are de-tuned from wavelength $\lambda_1$, such that further travel of wavelength $\lambda_1$ to the east direction is prevented. As described above though, in at least one embodiment, simultaneous communication of the same wavelength in both the east and west directions may be desirable in some cases.

Accordingly, for a particular wavelength $\lambda_k$, the respective heating element 614 of a given ring structure 610$_k$ may be set to a temperature state $T_k$ (e.g., temperature sub-states $T_{k\text{-}west}$ or $T_{k\text{-}east}$) such that the diameters, $R_{k\text{-}west}$ and $R_{k\text{-}east}$, of ring resonators 612 in west rings 618$_k$ and east rings 616$_k$, respectively, will expand (or contract) to achieve resonance for the desired west or east direction of wavelength $\lambda_k$. In the exemplary embodiment depicted in FIG. 6, ring diameter $R_{k\text{-}west}$ is less than $R_{k\text{-}east}$. The person of ordinary skill in the art though, will understand that this particular relationship is illustrative of an operational principle, and is not intended to be limiting. Other design factors may be considered with respect to the particular ring diameters.

Thus, for a given ring structure 610$_k$ to achieve communication of a wavelength $\lambda_k$ in the west direction, heating element 614$_k$ is set to temperature state $T_{k\text{-}west}$, and the following conditions are met:

$$n\lambda_k = 2\pi R_{k\text{-}west}, \text{ and} \qquad\qquad (\text{Eq. 1})$$

$$m\lambda_k \neq 2\pi R_{k\text{-}east}, \qquad\qquad (\text{Eq. 2})$$

where n and m are integers to achieve resonance at the west and east directions, respectively. Accordingly, where communication in only the west direction is desired for wavelength $\lambda_k$, west rings 618$_k$ will absorb the $\lambda_k$ signal energy, and east rings 616$_k$ will not absorb the $\lambda_k$ signal energy.

Architecture is therefore advantageous in its capability to switch communication of the wavelength $\lambda_k$ in the east direction. In this scenario, the need for a physical switching mechanism is eliminated. Instead, heating element 614$_k$ will be alternatively set to temperature state $T_{k\text{-}east}$, which will then satisfy the following conditions:

$$m\lambda_k = 2\pi R_{k\text{-}east}, \text{ and} \qquad\qquad (\text{Eq. 3})$$

$$n\lambda_k \neq 2\pi R_{k\text{-}west}. \qquad\qquad (\text{Eq. 4})$$

Accordingly, by changing the temperature state/sub-state (e.g., using a control signal from a processor) of heating element 614$_k$, the direction of a particular wavelength $\lambda_k$ may be easily changed. Thus, for the east direction, east rings 616$_k$ will absorb the $\lambda_k$ signal energy, and west rings 618$_k$ will not absorb the $\lambda_k$ signal energy.

These exemplary operational principles are not limited to a single wavelength. That is, for one or more additional wavelengths k' different than k (i.e., $\lambda_{k'} \neq \lambda_k$), the respective heating element(s) 614$_{k'}$ of a different ring structure 610$_{k'}$ may be similarly controlled such that the following condition is met at a temperature state $T_{k'\text{-}west}$ for heating element 614$_{k'}$:

$$p\lambda_k \neq 2\pi R_{k\text{-}west}. \qquad\qquad (\text{Eq. 5})$$

where p is an integer to achieve resonance for the wavelength(s) $\lambda_{k'}$, and ring structure(s) 610$_{k'}$ will not, therefore, absorb $\lambda_k$ signals coming from the west direction. Similarly, the temperature state $T_{k'\text{-}east}$ of heating element 614$_{k'}$ may be controlled to satisfy:

$$q\lambda_k + 2\pi R_{k\text{-}east}. \qquad\qquad (\text{Eq. 6})$$

where q also represents an integer to achieve resonance for the wavelength(s) $\lambda_{k'}$, and ring structure(s) 610$_{k'}$ will not absorb $\lambda_k$ signals directed to the east direction.

In this manner, the person of ordinary skill in the art will understand how the respective diameters R of individual ring resonators 612 may be controlled such that each respective ring structure 610 may be tuned to absorb only the energy for a specific wavelength, and to not absorb the signal energy of other wavelengths. By this advantageous configuration of architecture 600, multiple wavelengths may be communicated along a single optical pathway (e.g., east/ west optical pathways 602) without requiring additional switches, splitters, or other optical components to enable individual add/drop ports 608 to send or receive one or more particular desired wavelength signals.

Systems and methods according to the present systems and methods are further advantageous over conventional techniques with respect to the real-time flexibility realized according to architecture 600. Conventional optical wavelength switching architectures are typically fixed to the individual optical wavelengths steered thereto, and generally are configured to simply switch the direction of that wavelength. For example, conventional individual ring resonators typically resonate at the natural frequency defined by their physical manufacturing dimensions, and are not flexible to tune to a different frequency outside of the manufacturing tolerances. In contrast, the principles described above with respect to architecture 600 illustrate how an individual ring structure 610 may not be limited to a single wavelength.

As described above, each heating element (or other control mechanism) may be configured for multiple temperature states (or electrolytic effects). In consideration of the overall structural design and practical environmental conditions about architecture 600, each temperature state of heating element 614 may dynamically control the diameter of particular ring resonators 612 for different respective frequencies. As the ring order is increased, a particular ring structure 610 is enabled to tune within a broader range of wavelengths. That is, the more ring resonators 612 provided within a single ring structure 610, the less each individual ring resonator 612 will need to expand or contract for the overall ring structure 610 to tune to a desired wavelength. Accordingly, each ring structure 610 may be dynamically and flexibly tuned (e.g., according to the temperature state of heating element 614) to multiple wavelengths for the same ring structure 610.

In this manner, a particular ring structure 610 may provide redundancy for one or more other ring structures, or may be controlled to substitute for another ring structure in the case of failure of that component. The frequency flexibility of ring structure 610 may further increase as the order of the topology increases. For example, according to the second order topology depicted in FIG. 6, to tune from one wavelength to another, a smaller change is needed to the individual diameters of two coupled ring resonators 612 than would be needed to tune a single ring resonator between the same wavelengths. This advantageous capability further increases as the order of the topology increases, as described further below with respect to FIG. 7.

Figure 7:
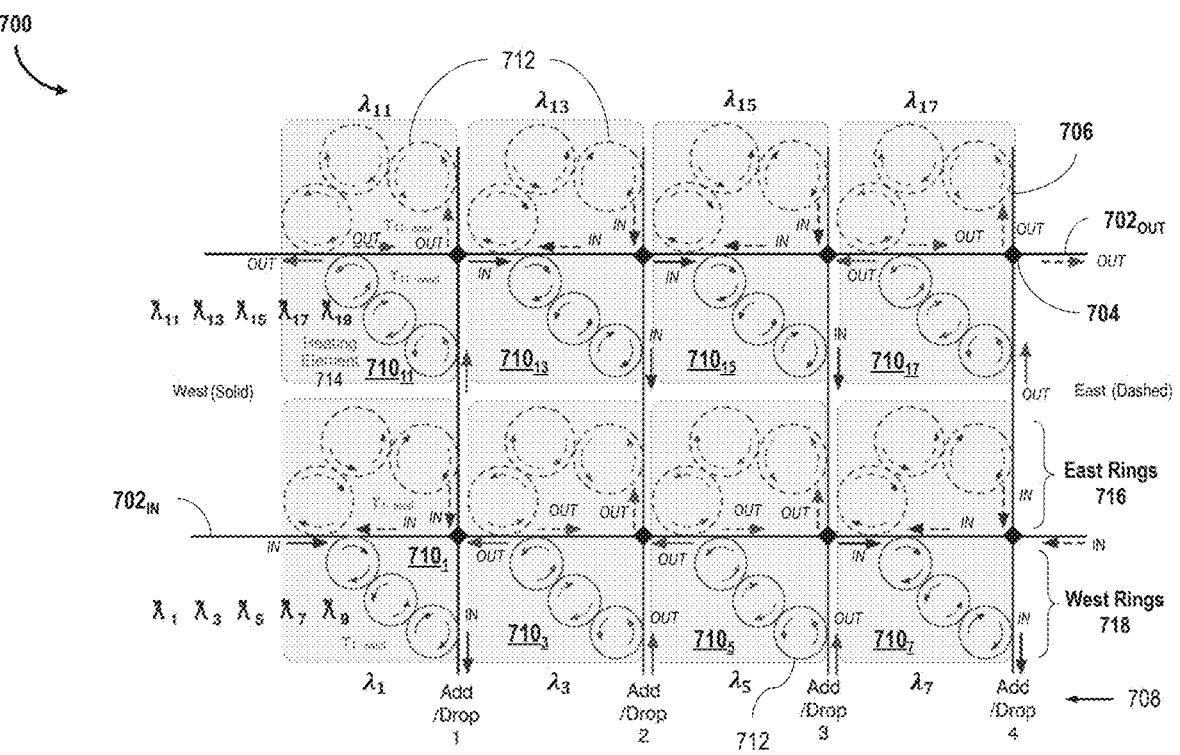
FIG. 7 is a schematic illustration depicting an alternative architecture for the flexible wavelength topology depicted in FIG. 4A.

FIG. 7 is a schematic illustration depicting an alternative architecture 700 for flexible wavelength topology 402, FIG. 4A. In the exemplary embodiment depicted in FIG. 7, architecture 700 is similar to architecture 600, FIG. 6, except that architecture 700 represents a third-order ring topology (i.e., three rings per wavelength in each direction) for an FDX EWSS. That is, similar to architecture 600, architecture 700 conforms to a row-and-column topology, including one or more east/west optical pathways 702 for communicating one or more wavelengths (e.g., odd wavelengths $\lambda_1$, $\lambda_3$, $\lambda_5$, . . . , in this example for ease of comparison with FIG. 6), and for optical connection, at respective optical crosspoints 704 with one or more add/drop optical pathways 706 connecting to respective add/drop ports 708.

Architecture 700 also similarly includes a plurality of ring structures 710 having a plurality of ring resonators 712 therein coupled with a heating element 714, which collectively form third-order east rings 716 (solid lines in FIG. 7) and third-order west rings 718 (dashed lines in FIG. 7).

Except for the difference in order of east and west rings 716, 718, architecture 700 may operate in a manner substantially similar to that described above with respect to architecture 600. For architecture 700 though, by utilizing three rings for each directional wavelength, a relatively smaller diameter change is required to each individual ring resonator 712 to accomplish the same tuning change from one wavelength to another according to the temperature state of heating element 714. Thus, the flexibility of dynamic frequency selection increases with the increase from a second-order to a third-order topology.

Nevertheless, the number or ring resonators 612, 712 for a particular ring structure 610, 710 may be affected by design tradeoffs particular to the overall EWSS structure and the corresponding platform therefor (e.g., an IC substrate). Environmental temperature range limitations and design optimization parameters may also be considerations regarding the tradeoffs between the number/order of rings within a particular topology and the diameters of individual ring resonators. As described further below with respect to the following embodiments, the structural configuration and number of coupled ring resonators may further affect the precision with which the signal energy from an individual wavelength may be absorbed (or ignored) for adding and dropping to specific add/drop ports.

Figure 8:
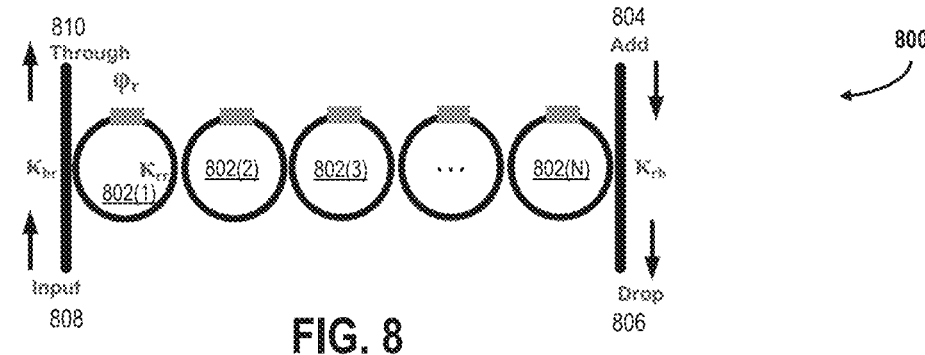
FIG. 8 is a schematic illustration depicting an exemplary serially-coupled microring architectural configuration, in accordance with an embodiment.

FIG. 8 is a schematic illustration depicting an exemplary serially-coupled microring architectural configuration 800. Configuration 800 is similar, in many aspects, to the configuration of ring resonator 200, FIG. 2, except that configuration 800 includes a plurality (i.e., 1-N) of serially-coupled microrings 802 disposed between a single set of an add port 804, a drop port 806, an input port 808, and a through port 810. Except for the coupling factor between adjacent microrings 802, configuration 800 may operate in a similar manner to ring resonator 200. The person of ordinary skill in the art will understand that the particular topology of configuration 800 is illustrated by way of example, and not in a limiting sense. More (e.g., higher order) or fewer (e.g., lower order) microrings 802 may be serially-coupled between the respective ports 804, 806, 808, 810 to meet particular design criteria. Additionally, as described further below with respect to FIG. 9, the plurality of microrings 802 need not be arranged in a series directly perpendicular to the input/through lines and/or the add/drop lines.

Figure 9:
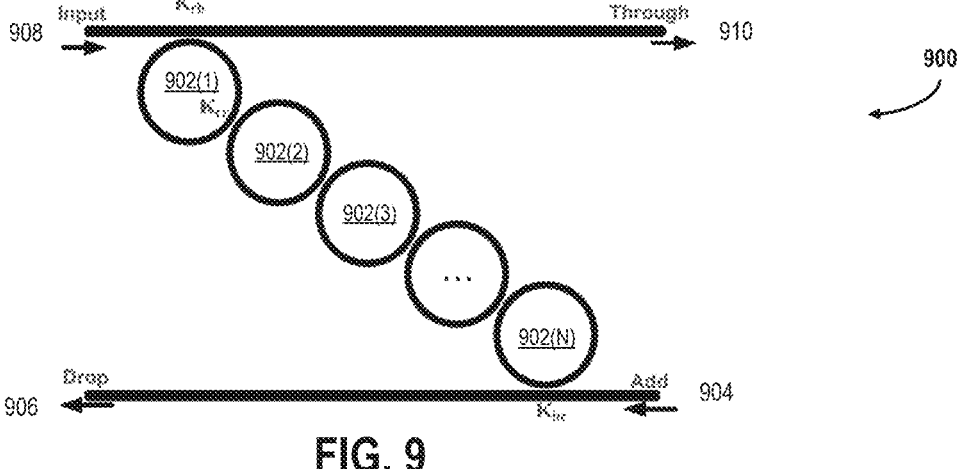
FIG. 9 is a schematic illustration depicting an alternative serially-coupled microring architectural configuration, in accordance with an embodiment.

FIG. 9 is a schematic illustration depicting an alternative serially-coupled microring architectural configuration 900. Configuration 900 is substantially similar to configuration 800, FIG. 8, and includes a comparable plurality (i.e., 1-N) of serially-coupled microrings 902 disposed between a single set of an add port 904, a drop port 906, an input port 908, and a through port 910, except that the plurality of serially-coupled microrings 902 are arranged substantially along a line that is oblique (i.e., neither perpendicular nor parallel) to the input/through lines and/or the add/drop lines. This skewed configuration may be desirable, for example, in a scenario where there is less width between sufficiently lengthy optical pathways on an IC chip structure layout, but a higher order ring system is desired for precise capture of a particular wavelength (e.g., described further below with respect to FIG. 10.

Figure 10:
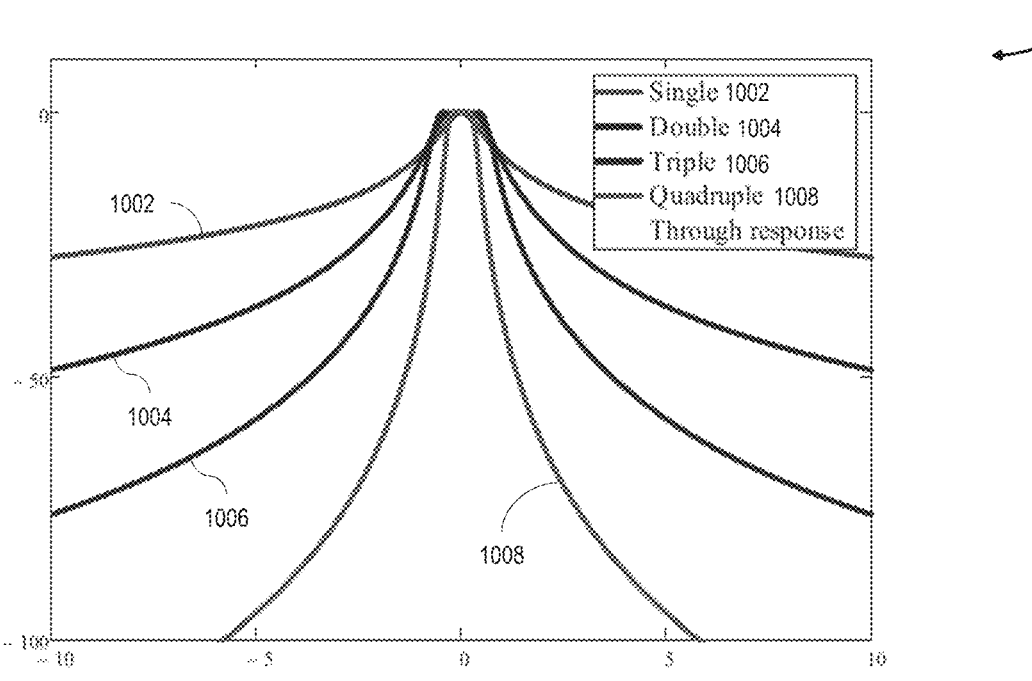
FIG. 10 is a graphical illustration depicting an exemplary response plot for the architectural configurations depicted in FIGS. 8 and 9.

FIG. 10 is a graphical illustration depicting an exemplary response plot 1000 for architectural configurations 800 and 900, FIGS. 8 and 9, respectively. In the exemplary embodiment depicted in FIG. 10, response plot depicts exemplary time-dependent spectral through responses of serially-coupled microring configurations 800, 900 for a single-ring, first-order design (i.e., sub-plot 1002), a double-ring, second-order design (i.e., sub-plot 1004), a triple-ring, third-order design (i.e., sub-plot 1006), and a quadruple-ring, fourth-order design (i.e., sub-plot 1008). As can be seen from response plot 1000, the higher order serially-coupled rings are able to much more precisely capture (i.e., absorb) the signal energy of a particular wavelength within a narrower frequency range that demonstrates a much lower propensity to potentially overlap with the sideband signal energy of an adjacent wavelength (odd or even).

The person of ordinary skill in the art will further appreciate that this precision effect for higher order serially-coupled structures is different, albeit complementary with, the increased flexibility effect, described above, where a ring structure heating element may advantageously utilize a narrower range of temperature states to change the ring diameters of a higher order ring structure than for a lower order ring structure. The precision effect of FIG. 10 arises from the number of rings, whereas the flexible dynamic tunability effect of FIGS. 6 and 7 arises from the diameter(s) of the individual rings themselves, and how much of a temperature change is necessary to increase the diameters to absorb a different wavelength, in contrast to the relatively smaller changes needed for a greater number of rings per structure. Therefore, even though it may have been conventionally known to increase the ring order for more precise wavelength capture, it was not known, prior to the present application, how to further utilize such higher order ring configurations to flexibly tune the relevant ring structure to different wavelengths.

Figure 11:
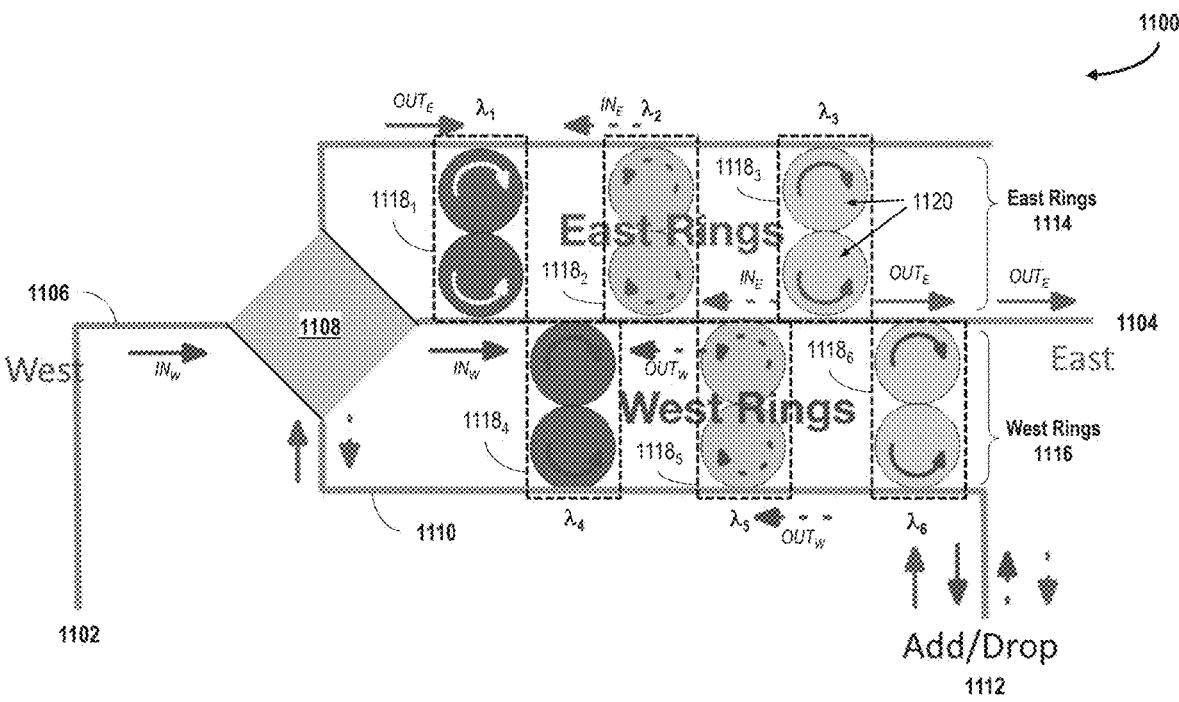
FIG. 11 is a schematic illustration depicting an alternative architecture for the flexible wavelength topology depicted in FIG. 4A.

FIG. 11 is a schematic illustration depicting an alternative architecture 1100 for flexible wavelength topology 402, FIG. 4A. In the exemplary embodiment depicted in FIG. 11, architecture 1100 is similar, in some aspects to architecture 600, FIG. 6, and architecture 700, FIG. 7, except that architecture 1100 implements a parallel coupled ring topology. For example, architecture 1100 similarly includes a West port 1102 in communication with an East port 1104 over an east/west optical pathway 1106. An optical crosspoint 1108 is disposed along east/west optical pathway 1106 between West port 1102 and East port 1104, and optically connects east/west optical pathway 1106 to an add/drop optical pathway 1110 for an add/drop port 1112. In an embodiment, optical pathways 1106, 1110 may each include an optical waveguide.

For FDX operation, architecture 1100 further includes a plurality of east rings 1114 and a plurality of west rings 1116 respectively disposed between east/west optical pathway 1106 and an arm of add/drop optical pathway 1110. Each of east and west rings 1114, 1116 includes one or more ring structures 1118 having one or more ring resonators 1120 disposed therein. In the exemplary embodiment depicted in FIG. 11, each ring structure 1118 is illustrated to include at least two serially-coupled ring resonators 1120 (i.e., second-order or higher) between the respective optical pathways 1106, 1110, and each of east and west rings 1114, 1116 includes a plurality of ring structures 1118 disposed in parallel to form a "ladder" topology of ring resonators 1120 in each direction of the east and west directions of architecture 1100.

In exemplary operation of architecture 1100, each of ring structures 1118 may operate similarly to ring structures 610, FIG. 6, and be controlled by a heating element thereof (not shown in FIG. 11) such that each individual ring structure 1118 may be dynamically tuned to absorb the signal energy of one particular wavelength and ignore the signal energy of other wavelengths. In the exemplary embodiment depicted in FIG. 11, architecture 1100 is illustrated for the case where a single add/drop port 1112 may be enabled to communicate multiple different wavelengths to and from both of the east and west directions (e.g., 11 and 13 transmitted east, 12 received from the east, 24 and 16 received from the west, and 15 transmitted west). Utilizing this versatile and flexible topology for architecture 1100, architecture 1100 thus serves as a functional building block for an FDX EWSS.

In the example depicted in FIG. 11, the plurality of ring structures 1118 are illustrated to each correspond to a different respective wavelength $\lambda_{1-6}$, that is, each such ring structure 1118 in this example would constitute a second-order serial coupling (i.e., in a direction perpendicular to optical pathways 1106, 1110), but only a single-order parallel coupling (i.e., in a direction parallel to optical pathways 1106, 1110). Architecture 1100 thus represents an exemplary design using an even number of rings 1120. The person of ordinary skill in the art will understand that this example is provided for ease of explanation, and is not intended to be limiting.

The person of ordinary skill in the art will further understand that the innovative configuration of architecture 1100 may eliminate the need for multiplexers (e.g., multiplexers 414, 416, FIGS. 4A, 5) and/or interleavers (e.g., interleavers 410, 418, FIGS. 4A, 5) to avoid potential interference between adjacent wavelengths. As described above with respect to FIGS. 10 and 12C, the topology design of the number of rings (i.e., ring order) may be optimized to mitigate or eliminate this concern. Furthermore, in the case where a wider bandwidth is desired for a particular wavelength, two more ring structures 1118 may be controlled such that each individual ring structure in this particular arrangement will resonate for different portions of the optical spectrum of the desired broader wavelength.

As described further below with respect to FIGS. 12A-C, each individual ring structure 1118 may also include second-order or higher parallel-coupled ring resonators 1120. Alternatively, two or more adjacent ring structures 1118 may function together as a coordinated second-order serial coupling/second-order parallel coupling structure, such as in the case where all resonators 1120 therein may be dynamically tuned to the same wavelength.

Figures 12A, 12B, 12C:
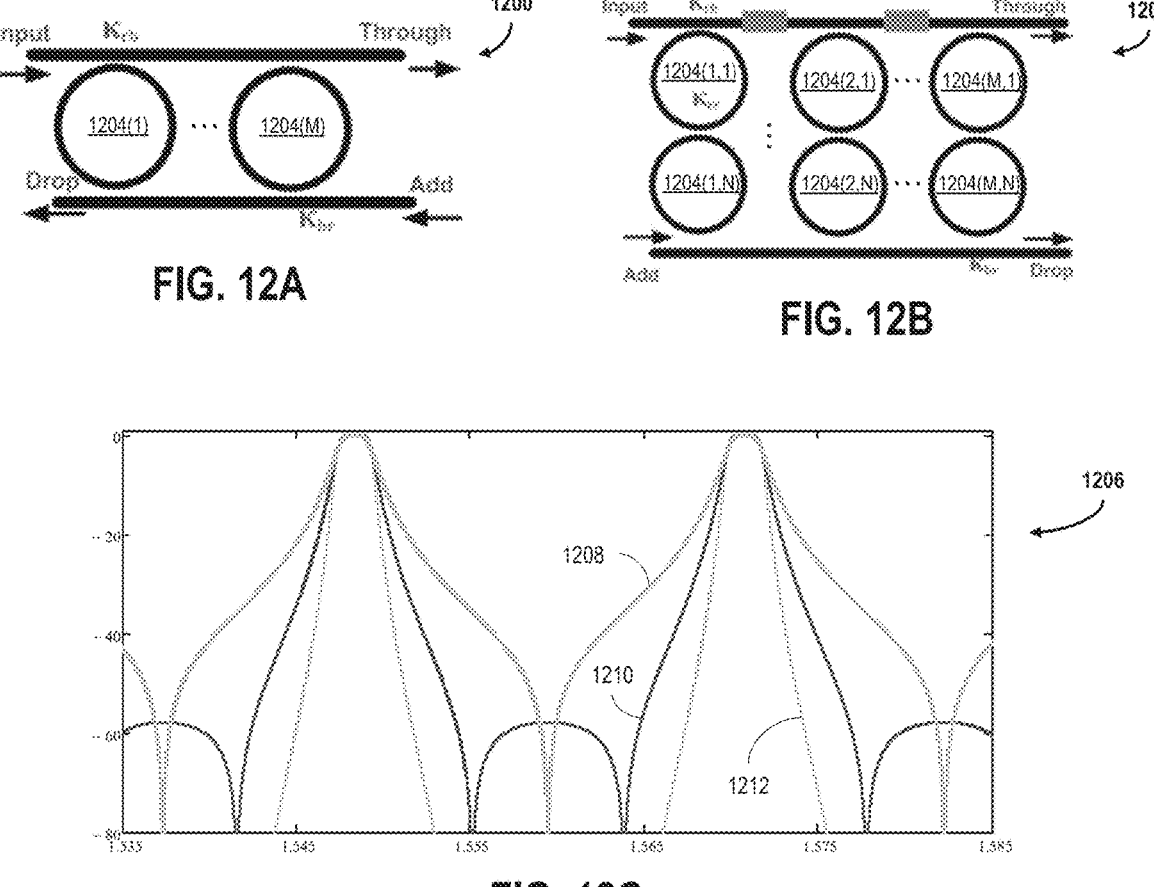
FIG. 12A-B are schematic illustrations depicting exemplary parallel coupled ring resonator architectural configurations, in accordance with an embodiment.
FIG. 12C is a graphical illustration depicting an exemplary response plot for the architectural configuration depicted in FIG. 12B.

FIGS. 12A-B are schematic illustrations depicting exemplary parallel coupled ring resonator architectural configurations 1200, 1202. For configuration 1200, a plurality (i.e., 1-M) of ring resonators 1204 are arranged in a parallel direction with respect to the optical pathways connecting the several ports of the resonator structure. Configuration 1202 expands the one-dimensional parallel arrangement of configuration 1200 into a two-dimensional arrangement that includes a plurality (i.e., 1-N) of ring resonators 1204 serially-coupled with each parallel ring resonator 1204 to form a ladder architecture.

FIG. 12C is a graphical illustration depicting an exemplary response plot 1206 for architectural configuration 1202, FIG. 12B. Response plot 1206 includes a first subplot 1208 depicting the response of a second-order (i.e., M=2) parallel-coupled ring resonator, a second subplot 1210 depicting the response of a third-order (i.e., M=3) parallel-coupled ring resonator, and a third subplot 1212 depicting the response of a fifth-order (i.e., M=5) parallel-coupled ring resonator. From response plot 1206, it may be seen how the precision of the wavelength tuning increases with the order of rings included in the resonator. The person of ordinary skill in the art will understand though, similar to the precision effect of serial-coupled rings described above, that this precision effect for an individual wavelength is different than the capability to tune a particular ring structure (e.g., ring structure 1118, FIG. 11) to different wavelengths more easily with a higher order ring structure. Nevertheless, both such effects may be considered in the design and optimization of the particular ring-based architecture.

Figures 13, 14:
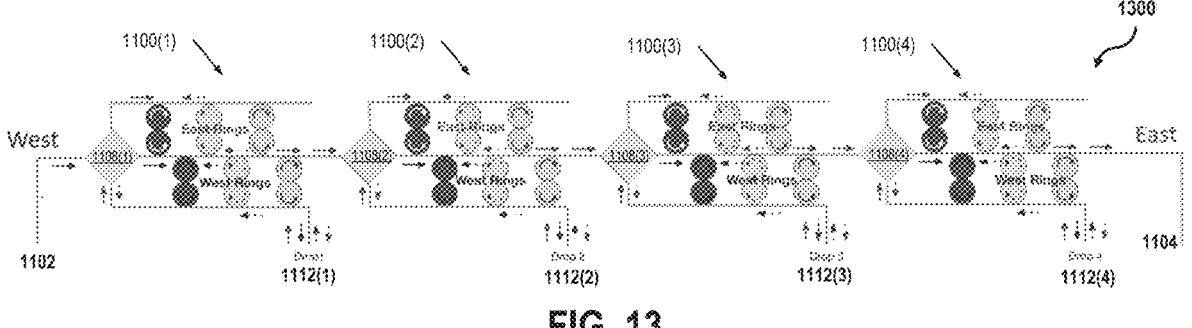
FIG. 13 is a schematic illustration depicting an exemplary cascade configuration for the architecture depicted in FIG. 11.
FIG. 14 is a partial schematic illustration depicting an exemplary conversion scheme for the cascade configuration depicted in FIG. 13.

FIG. 13 is a schematic illustration depicting an exemplary cascade configuration 1300 for architecture 1100, FIG. 11. In an exemplary embodiment, cascade configuration 1300 includes a plurality of architectures 1100 disposed between a single west port 1102 and east port 1104, FIG. 11. That is, each add/drop port 1112 may be configured to communicate with its own respective architecture 1100 for dynamic tunability of multiple wavelengths to and from that respective add/drop port 1112, and in each direction. In an embodiment, such as in the case of an integrated chip (IC) design, the distance between crosspoints 1108 may be approximately 300 μm, with the total distance from west port 1102 to east port 1104 being approximately 1800 μm. However, the person of ordinary skill in the art will understand that such dimensions are provided by way of illustration, and are not intended to be limiting. Greater or lesser distances between crosspoints may be achieved, and the spacing between the individual crosspoints need not be uniform.

FIG. 14 is a partial schematic illustration depicting an exemplary conversion scheme 1400 for cascade configuration 1300, FIG. 13. In an exemplary embodiment, conversion scheme 1400 represents a functional design principle enabling integration of cascade configuration 1300 and architecture 1100 with a plurality of optical fibers 1402, which may, for example, be found in an optical communication network. In the embodiment depicted in FIG. 14, optical fibers 1402 includes a west fiber 1404 for communication with west port 1102, FIG. 11, an east fiber 1406 for communication with east port 1104, and one or more add/drop fibers 1408 for communication with respective add/drop ports 1112. Communication between optical fibers 1402 and the respective ports 1102, 1104, 1112 may, for example, be facilitated by way of at least one mode converter 1410 connecting the optical fiber 1402 to the optical pathway or waveguide leading from the respective port. In an embodiment, conversion scheme 1400 may implement a 250 μm pitch (e.g., to align with a Corning fiber array), and further deploy the fiber array alignment in consideration of one or more of x, y, z, roll, pitch, and yaw parameters.

Figure 15:
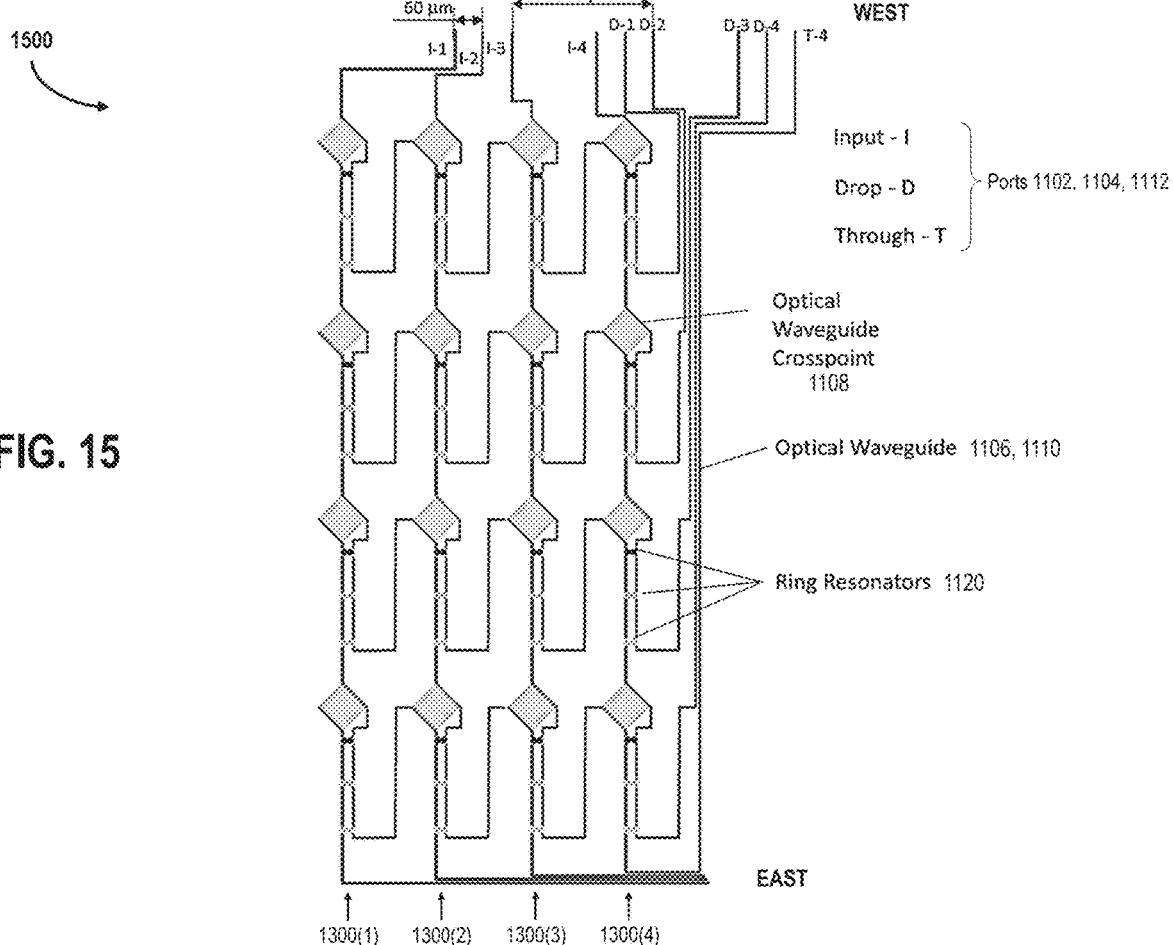
FIG. 15 is a schematic illustration depicting an exemplary fabrication layout for the cascade configuration depicted in FIG. 13.

FIG. 15 is a schematic illustration depicting an exemplary fabrication layout 1500, for cascade configuration 1300, FIG. 13. In the exemplary embodiment depicted in FIG. 15, fabrication layout 1500 illustrates a parallel integration of a plurality of cascade configurations 1300 (four parallel cascade configurations 1300, in this example) that may be fabricated onto an IC substrate, for example, in the case of a 4×4 WSS Switch (UCSB). The person of ordinary skill in the art will understand that the particular fabrication layout 1500 is provided by way of example, and is not intended to be limiting.

Figure 16:
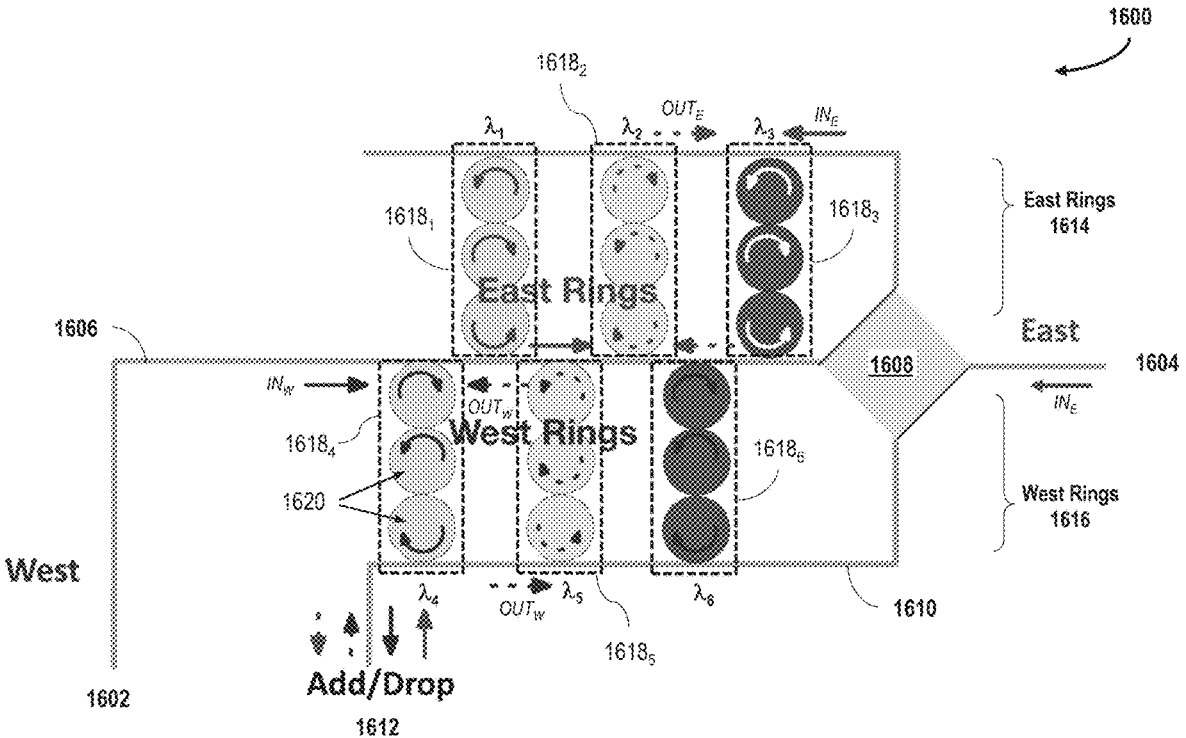
FIG. 16 is a schematic illustration depicting an alternative architecture for the flexible wavelength topology depicted in FIG. 4A.

FIG. 16 is a schematic illustration depicting an alternative architecture 1600 for flexible wavelength topology 402, FIG. 4A. In the exemplary embodiment depicted in FIG. 16, architecture 1600 is similar in overall structure and functionality to architecture 1100, FIG. 11, and includes a West port 1602 in communication with an East port 1604 over an east/west optical pathway 1606, with an optical crosspoint 1608 also disposed therebetween along east/west optical pathway 1606. Architecture 1600 also similarly includes an add/drop optical pathway 1610 for an add/drop port 1612, a plurality of east rings 1614 and a plurality of west rings 1616, each including one or more ring structures 1618 having one or more ring resonators 1620 disposed therein. Architecture 1600 differs though from architecture 1100, in that each of ring structures 1618 are configured to contain an odd number of ring resonators 1620 (three ring resonators 1620 each, in this example). Accordingly, for the exemplary embodiment depicted in FIG. 16, each ring structures 1618 is illustrated to include at least a third-order serial coupling of ring resonators 1620, similar to the operational principles described above with respect to ring structures 710, FIG. 7. In other aspects, architecture 1600 may functionally operate in a manner substantially similar to that described above with respect to architecture 1100, FIG. 11.

Figure 17:
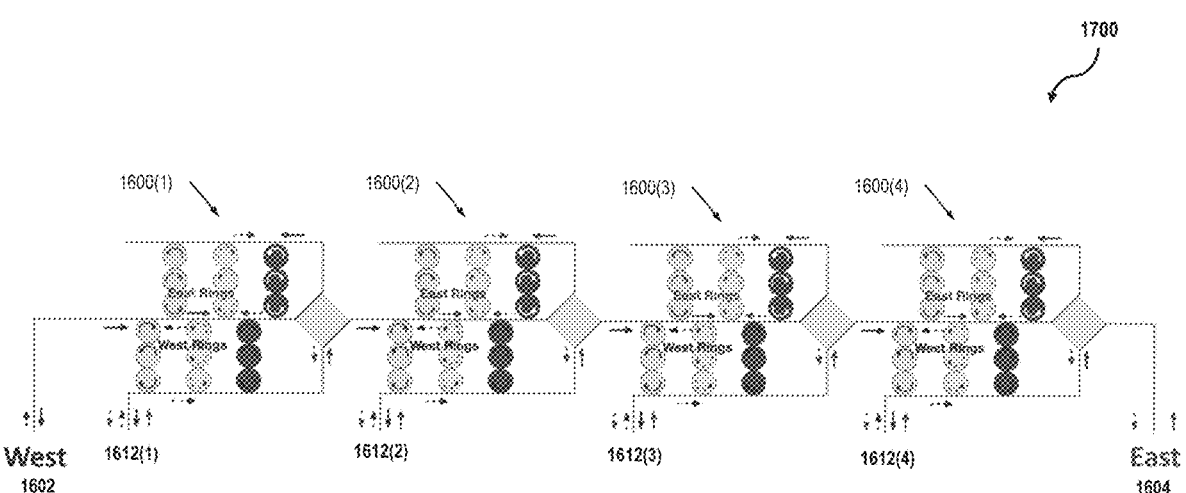
FIG. 17 is a schematic illustration depicting an exemplary cascade configuration for the architecture depicted in FIG. 16.

FIG. 17 is a schematic illustration depicting an exemplary cascade configuration 1700 for architecture 1600, FIG. 16. In an exemplary embodiment, cascade configuration 1700 includes a plurality of architectures 1600 disposed between a single west port 1602 and east port 1604, FIG. 16. That is, each add/drop port 1612 may be configured to communicate with its own respective architecture 1600 for dynamic tunability of multiple wavelengths to and from that respective add/drop port 1612, and in each direction.

Figure 18:
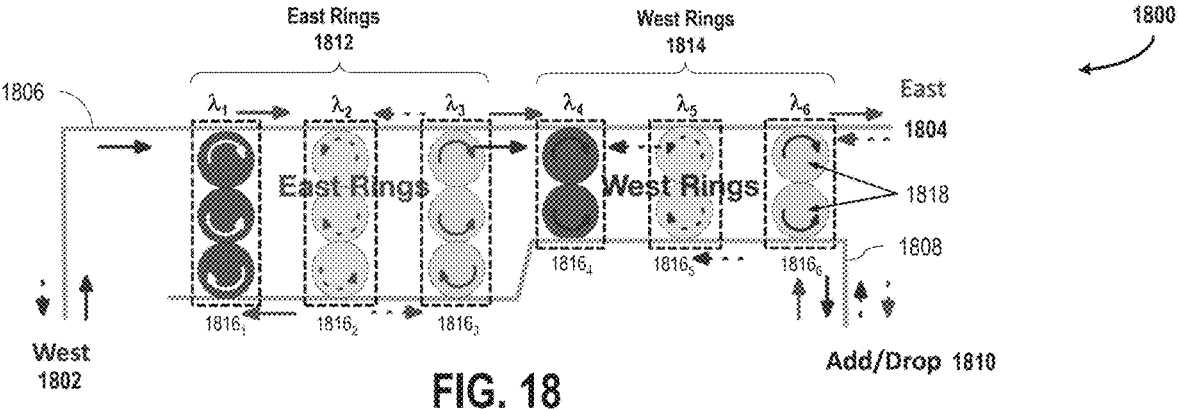
FIG. 18 is a schematic illustration depicting an exemplary hybrid architecture for the flexible wavelength topology depicted in FIG. 4A.

FIG. 18 is a schematic illustration depicting an exemplary hybrid architecture 1800 for flexible wavelength topology 402, FIG. 4A. In the exemplary embodiment depicted in FIG. 18, hybrid architecture 1800 is similar, in many aspects, to architectures 1100, FIG. 11, and 1600, FIG. 16, and includes a West port 1802 in communication with an East port 1804 over an east/west optical pathway 1806. Hybrid architecture 1800 also similarly includes an add/drop optical pathway 1808 for an add/drop port 1810, a plurality of east rings 1812 and a plurality of west rings 1814, each including one or more ring structures 1816 having one or more ring resonators 1818 disposed therein.

Hybrid architecture 1800 differs though, from architectures 1100, 1600 with respect to the disposition of east rings 1812 relative to west rings 1814. That is, whereas east rings 1114, 1614 are disposed serially from west rings 1116, 1616 across optical pathways 1106, 1606 in architectures 1100, 1600, respectively, in a hybrid architecture 1800, east rings 1812 are disposed in a parallel configuration with west rings 1814 with respect to east/west optical pathway 1806. According to this alternative exemplary embodiment, the various ring structures 1816 may contain different respective odd or even number of ring resonators 1818 for different ring structures 1816. It may also be noted that, for this unique hybrid topology, an additional optical crosspoint may not be needed for a single add/drop port 1810.

Figure 19:
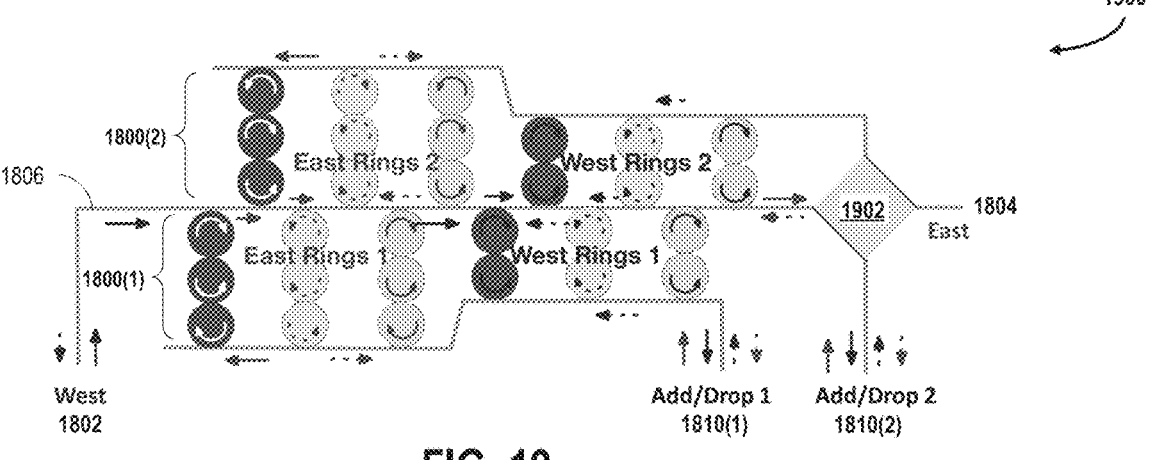
FIG. 19 is a schematic illustration depicting a serial configuration for the hybrid architecture depicted in FIG. 18.

FIG. 19 is a schematic illustration depicting a serial configuration 1900 for hybrid architecture 1800, FIG. 18. In an exemplary embodiment, serial configuration 1900 includes a plurality of hybrid architectures 1800 disposed between a single west port 1802 and east port 1804, FIG. 18, but in a serial configuration, as opposed to a cascaded configuration (see e.g., FIG. 13). That is, each add/drop port 1810 may be configured to communicate with its own respective architecture 1800 for dynamic tunability of multiple wavelengths to and from that respective add/drop port 1810, and in each direction. It may be noted though, that for this exemplary configuration, at least one optical crosspoint 1902 may be included to enable more than one add/drop port 1810 to communicate with the same east/west optical pathway 1806.

Figures 20, 21:
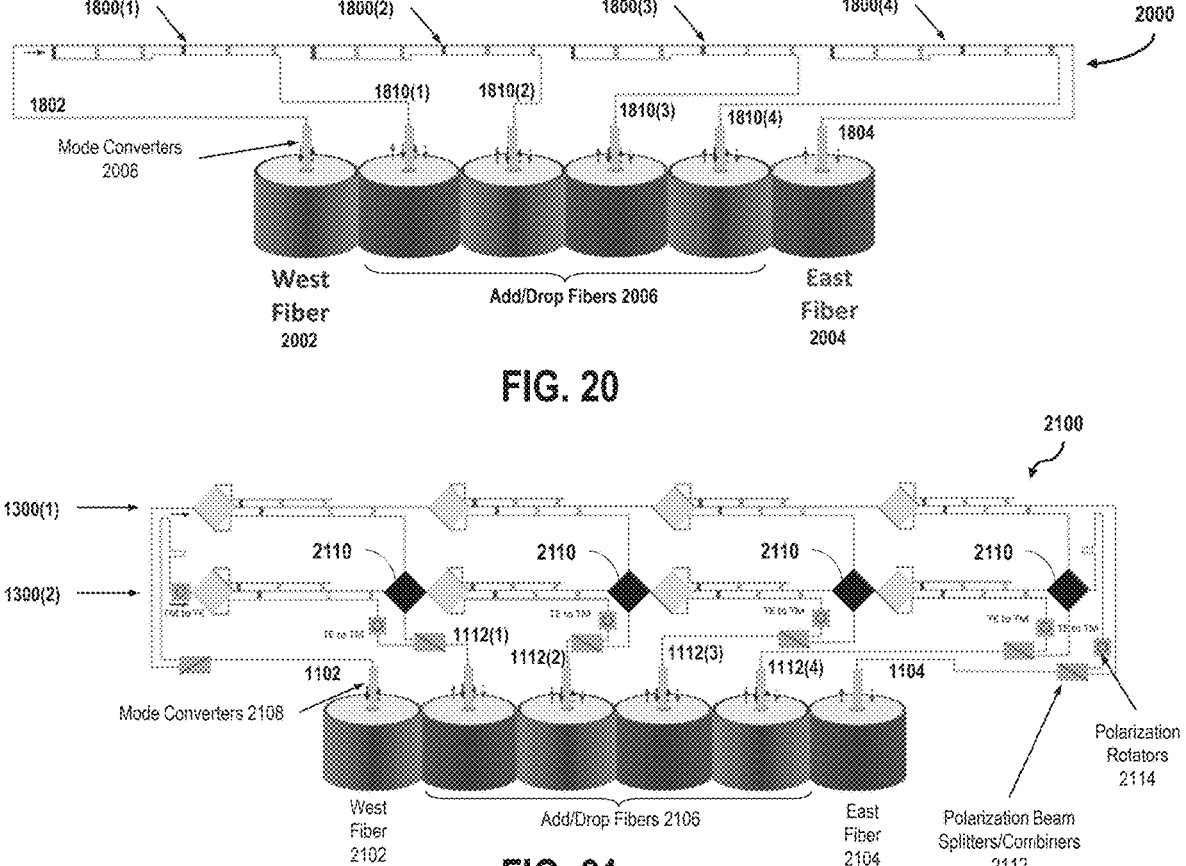
FIG. 20 is a partial schematic illustration depicting an exemplary conversion scheme for a cascaded deployment of the hybrid architecture depicted in FIG. 18.
FIG. 21 is a partial schematic illustration depicting an exemplary conversion scheme for a dual polarization deployment of the cascade configuration depicted in FIG. 13.

FIG. 20 is a partial schematic illustration depicting an exemplary conversion scheme 2000 for a cascaded configuration of hybrid architecture 1800, FIG. 18. In an alternative embodiment to FIG. 19, a plurality of hybrid architectures 1800 may also be disposed in a cascaded sequence between a single west port 1802 and east port 1804, and each add/drop port 1810 may be configured to communicate with its own respective hybrid architecture 1800 for dynamic tunability of multiple wavelengths to and from that respective add/drop port 1810 in each direction. It may be noted that, for this cascaded configuration of hybrid architecture 1800, optical crosspoints are not needed to enable the plurality of add/drop ports 1810. Accordingly, for this cascaded configuration of hybrid architecture 1800, conversion scheme 2000 may be implemented in a manner similar to the implementation of conversion scheme 1400, FIG. 14.

More particularly, conversion scheme 2000 may be similarly implemented with respect a west optical fiber 2002, an east optical fiber 2004, and one or more add/drop optical fibers 2006. Communication between optical fibers 2002, 2004, 2006 and the respective ports 1802, 1804, 1810 may thus be similarly facilitated by way of respective mode converters 2008 connecting an optical fiber to the optical pathway or waveguide leading from the corresponding port.

FIG. 21 is a partial schematic illustration depicting an exemplary conversion scheme 2100 for a dual polarization deployment of cascade configuration 1300, FIG. 13. Conversion scheme 2100 is similar, in many aspects, to conversion scheme 1400, FIG. 14, except that conversion scheme 2100 implements first and second cascade configurations 1300(1), 1300(2) to enable a dual polarization FDX EWSS. That is, both of cascade configurations 1300(1), 1300(2) may have the same respective path length, but different polarization of signals between the two. In the exemplary embodiment, both of first and second cascade configurations 1300(1), 1300(2) are disposed in parallel between a single west port 1102 and east port 1104, and each add/drop port 1112 may be configured to communicate with one individual architecture (e.g., architecture 1100, FIG. 11) in both cascade configurations 1300(1), 1300(2).

Similar to conversion scheme 1400, west port 1102, east port 1104, and add/drop ports 1112 may communicate with a west optical fiber 2102, an east optical fiber 2104, and add/drop optical fibers 2106, respectively, through corresponding mode converters 2108. In an exemplary embodiment, a secondary crosspoint 2110 may be included for each add/drop port 1112 to enable the respective add/drop port 1112 to communicate with each of the differently-polarized cascade configurations 1300. In some embodiments, at least one cascade configuration 1300 (second cascade configuration 1300(2), in the example depicted in FIG. 21) may include one or more polarization beam splitters/combiners 2112 and/or one or more polarization rotators 2114.

Exemplary embodiments of systems and methods for ring-based edge wavelength selective switching techniques are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A wavelength selective switch (WSS), comprising:
a first optical pathway configured to carry a plurality of optical wavelengths, including a first optical wavelength and a second optical wavelength, to and from a first direction;
a second optical pathway configured to carry at least one optical wavelength of the plurality of optical wavelengths to and from a second direction different from the first direction;
a first add/drop port in communication with at least one of the first and second optical pathways over a third optical pathway;
a first tunable wavelength topology (i) coupled with the third optical pathway and at least one of the first and second optical pathways, (ii) configured to optically transport signal energy of the first optical wavelength from the first direction to the first add/drop port, and (iii) including multiple ring resonators of a plurality of serially-coupled ring resonators; and
a second tunable wavelength topology (i) coupled with the third optical pathway and at least one of the first and second optical pathways, (ii) configured to optically transport signal energy of the second optical wavelength from the first add/drop port to the first direction, and (iii) including multiple ring resonators of the plurality of serially-coupled ring resonators;
wherein at least one of the first and second tunable wavelength topologies is configured to, using a heating element, dynamically re-tune to a third optical wavelength different from the first and second optical wavelengths, wherein the heating element is configured to generate a plurality of temperature states that affects a ring diameter of at least one ring resonator of the plurality of serially-coupled ring resonators.

2. The WSS of claim 1, wherein each of the first and second tunable wavelength topologies further comprises a control element configured to tune the plurality of serially-coupled ring resonators to (i) be on resonance with a particular wavelength of the plurality of optical wavelengths, and (ii) exclude signal energy of wavelengths different than the particular wavelength.

3. The WSS of claim 2, wherein the control element comprises the heating element.

4. The WSS of claim 1, wherein each temperature state of the plurality of temperature states includes a first temperature sub-state for enabling optical communication between the first add/drop port and the first direction, and a second temperature sub-state for enabling optical communication between the first add/drop port and the second direction.

5. The WSS of claim 2, wherein the control element is further configured to dynamically control a ring diameter of the plurality of serially-coupled ring resonators according to an electrolytic effect configured to dynamically change the ring diameter.

6. The WSS of claim 2, wherein the control element is further configured to control an index of refraction of the plurality of serially-coupled ring resonators.

7. The WSS of claim 1, further comprising;

a third tunable wavelength topology (i) coupled with the third optical pathway and at least one of the first and second optical pathways, and (ii) configured to optically transport signal energy of a fourth optical wavelength from the second direction to the first add/drop port; and a fourth tunable wavelength topology (i) coupled with the third optical pathway and at least one of the first and second optical pathways, and (ii) configured to optically transport signal energy of a fifth optical wavelength from the first add/drop port to the second direction.

8. The WSS of claim 7, wherein the fourth optical wavelength is different than the first, second, and third optical wavelengths.

9. The WSS of claim 7, wherein the fourth optical wavelength is the same as the first optical wavelength.

10. The WSS of claim 7, wherein the third tunable wavelength topology is further configured for dynamic re-tuning to enable coupling, via resonance, of the signal energy of the first optical wavelength to the first add/drop port.

11. The WSS of claim 1, further comprising an optical crosspoint connecting the third optical pathway to one of the first and second optical pathways.

12. The WSS of claim 1, wherein the first optical pathway is contiguous with the second optical pathway.

13. The WSS of claim 1, wherein the first optical pathway is separate from the second optical pathway.

14. The WSS of claim 13, further comprising an interleaver disposed between the first optical pathway and the second optical pathway.

15. A flexible optical wavelength-selective architecture, comprising:

a directional optical pathway connecting a first optical direction to a second optical direction, and configured for carrying a plurality of optical wavelengths;

a first add/drop optical pathway connecting to a first add/drop port;

a first plurality of ring structures (i) coupling the directional optical pathway with the first add/drop optical pathway, and (ii) configured for carrying one or more optical wavelengths of the plurality of optical wavelengths between the first direction and the add/drop port; and a second plurality of ring structures (i) coupling the directional optical pathway with the first add/drop optical pathway, and (ii) configured for carrying one or more optical wavelengths of the plurality of optical wavelengths between the second direction and the add/drop port;

wherein each of the first and second plurality of ring structures includes:

a plurality of ring resonators having a ring diameter capable of being on resonance with at least one optical wavelength of the plurality of optical wavelengths; and a heating element configured to dynamically alter a size of the ring diameter of one or more ring resonators of the plurality of ring resonators to enable the respective ring structure to dynamically tune from a first signal energy of a first wavelength of the plurality of optical wavelengths to a second signal energy of a second, different wavelength of the plurality optical wavelengths;

the heating element being configured to generate a plurality of temperature states that affects a ring diameter of at least one ring resonator of the plurality of ring resonators.

16. The architecture of claim 15, wherein the first plurality of ring structures contains an odd number of ring resonators, and wherein the second plurality of ring structures contains an even number of ring resonators.

17. The architecture of claim 15, wherein the plurality of temperature states affects respective ring diameters of multiple ring resonators of the plurality of ring resonators.

18. The architecture of claim 15, further comprising a processor in electrical communication with the heating element and configured to control the heating element to generate the plurality of temperature states.

19. The WSS of claim 1, wherein the plurality of temperature states affects respective ring diameters of multiple ring resonators of the plurality of serially-coupled ring resonators.

20. The WSS of claim 1, further comprising a processor in electrical communication with the heating element and configured to control the heating element to generate the plurality of temperature states.

\*    \*    \*    \*    \*